Feb. 29, 1944.   A. H. EBERHART   2,343,121
AIR CONDITIONING APPARATUS
Filed July 27, 1940   6 Sheets-Sheet 1

WITNESSES:

INVENTOR
ARTHUR H. EBERHART
BY
ATTORNEY

Feb. 29, 1944.  A. H. EBERHART  2,343,121
AIR CONDITIONING APPARATUS
Filed July 27, 1940  6 Sheets-Sheet 2

WITNESSES:

INVENTOR
ARTHUR H. EBERHART.
BY
ATTORNEY

Feb. 29, 1944.  A. H. EBERHART  2,343,121
AIR CONDITIONING APPARATUS
Filed July 27, 1940  6 Sheets-Sheet 3

WITNESSES:
W. J. Eisinger
E. H. Lutz

INVENTOR
ARTHUR H. EBERHART.
BY
ATTORNEY

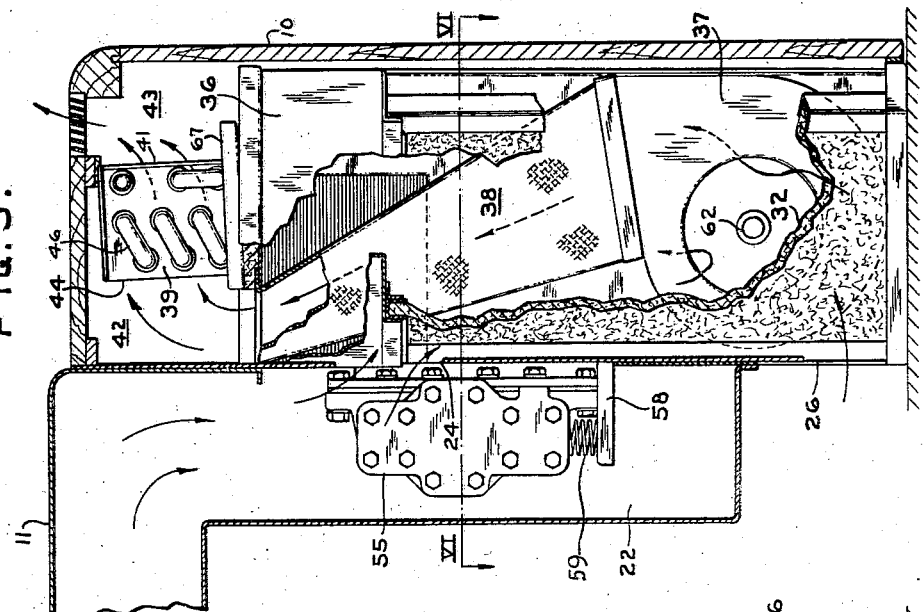
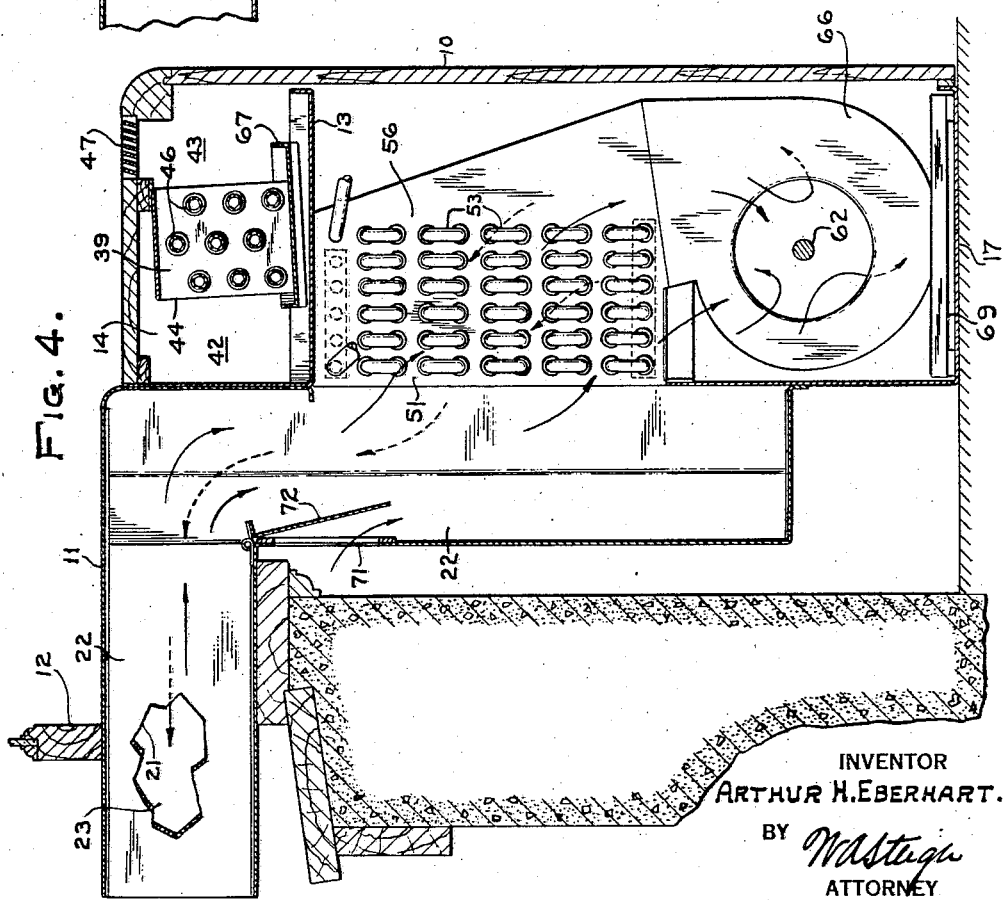

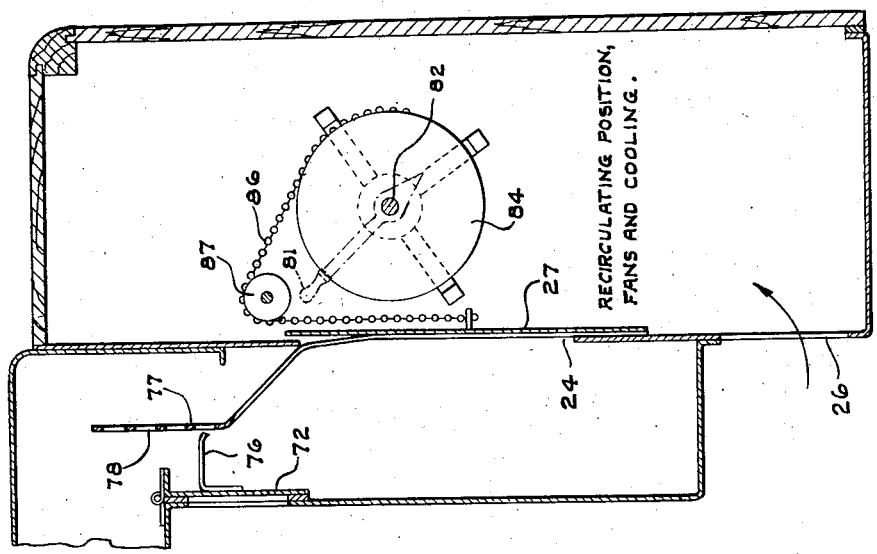
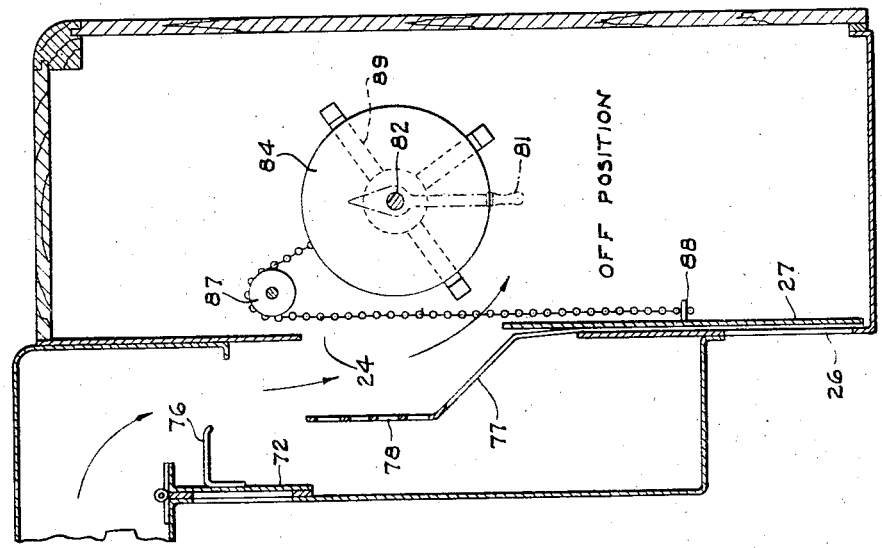

Feb. 29, 1944.   A. H. EBERHART   2,343,121
AIR CONDITIONING APPARATUS
Filed July 27, 1940   6 Sheets-Sheet 6
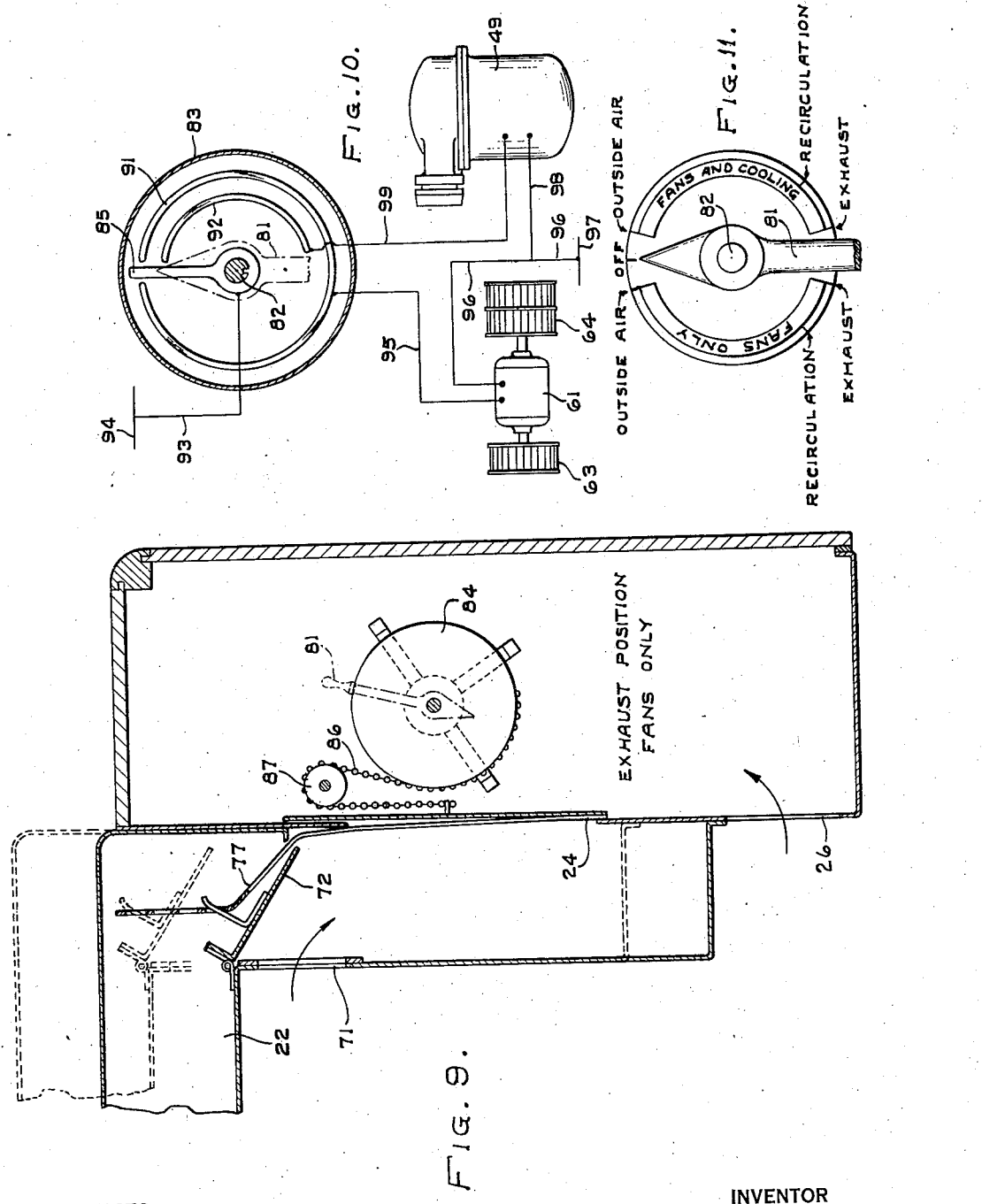
WITNESSES:
INVENTOR
ARTHUR H. EBERHART.
BY
ATTORNEY Patented Feb. 29, 1944

2,343,121

UNITED STATES PATENT OFFICE 2,343,121

AIR CONDITIONING APPARATUS

Arthur H. Eberhart, Springfield, Mass., assignor to Westinghouse Electric & Manufacturing Company, East Pittsburgh, Pa., a corporation of Pennsylvania Application July 27, 1940, Serial No. 347,997

21 Claims. (Cl. 62—129)

This invention relates to air conditioning apparatus and more particularly to a device for controlling such apparatus. It is especially suited to apparatus of the unit type such as portable room coolers.

The controls for air conditioning apparatus are rather complex when the apparatus is adapted for a multiplicity of operations, such as ventilation, air recirculation, air exhaust, and to perform these operations both with and without cooling the air.

It is accordingly an object of this invention to simplify the controls of air conditioning apparatus.

A further object is to combine the various controls of air conditioning apparatus for operation by a single control lever.

These and other objects are effected by my invention as will be apparent from the following description and claims taken in accordance with the accompanying drawings, forming a part of this application, in which:

Fig. 4 is a vertical section of the room cooler installed in a window, the section being taken on the line IV—IV of Fig. 6, but with the motor-compressor unit removed;

Fig. 5 is an elevation of the side of the room cooler with parts broken away to show the path of the air which enters the room;

Figure 6:
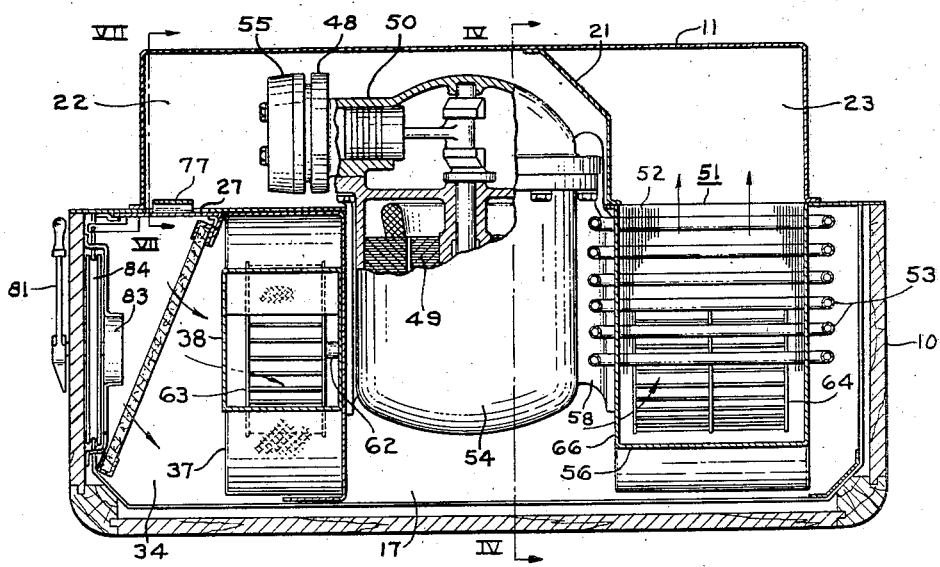
Fig. 6 is a horizontal section of the room cooler taken on the line VI—VI of Fig. 5, but with parts of the motor-compressor unit shown in full.
Figure 3:
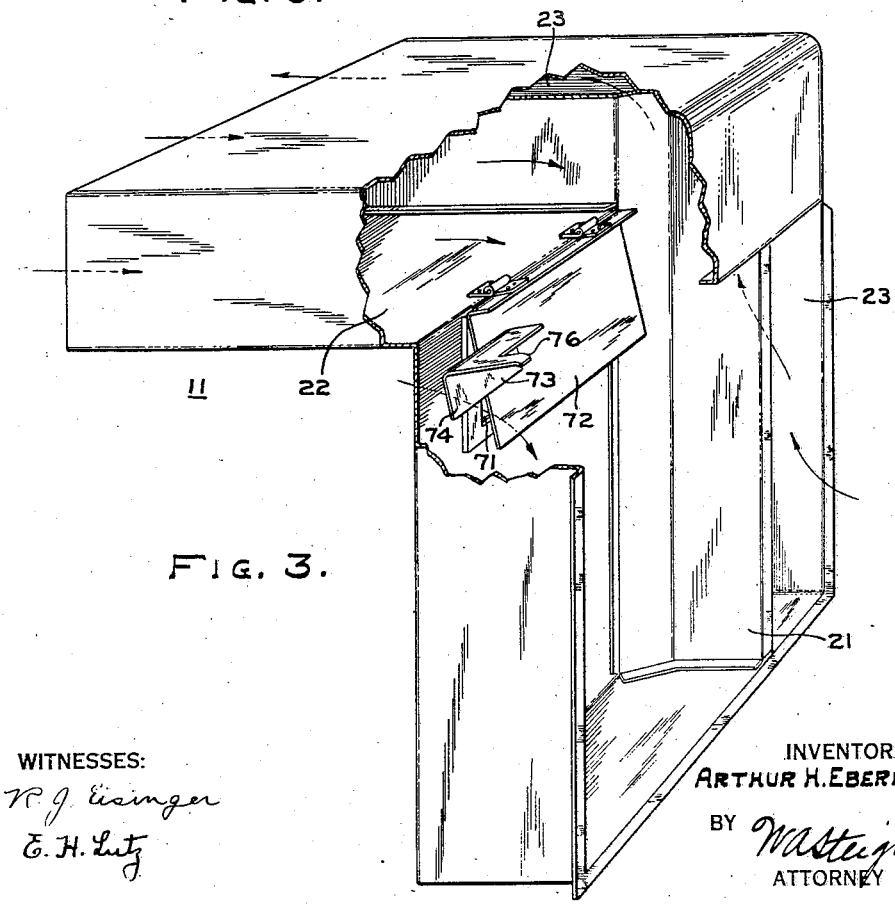
Fig. 3 is a view in perspective of the window duct structure with parts broken away.

Figs. 7, 8 and 9 are vertical sections of the window duct structure taken on the line VII—VII of Fig. 6 and show the manner in which the control lever actuates the air valves, Fig. 7 showing the control lever in the inactive or off position, Fig. 8 showing the control lever in the air recirculation and cooling position, and Fig. 9 showing the control lever in the room air exhaust position with the cooling cut off;

Fig. 10 is a schematic diagram of the wiring circuit and the control switch; and, Fig. 11 is a partial view of the control lever and the indicia associated therewith.

Referring now to the drawings in detail, the air conditioning apparatus is substantially identical with that described in application Serial No. 321,875, filed March 2, 1940, by the inventor of, and assigned to the assignee of this invention. The air cooling apparatus will be described first and thereafter the simplified control of this invention.

Air cooling apparatus

The reference numeral 10 represents a cabinet for housing the room cooler of this invention. A removable duct structure 11 is secured to the back of the cabinet 10 and is adapted to communicate with the air exterior of the room being cooled, preferably through an open window 12. The window duct structure 11 is adjustable as to height with respect to the cabinet 10 as shown in Fig. 9 to provide for connection to windows of varying window sill heights.

The cabinet 10 is divided by a horizontal wall 13 into an upper cooling compartment 14 and a lower compartment. The horizontal wall 13 is supported by a vertical wall 15 and by an end support or supports 16, which wall and supports are secured at their lower ends to a base plate 17. The vertical wall 15 divides the lower compartment into two chambers which will hereinafter be referred to as the filter compartment 18 and the apparatus compartment 19, respectively.

The window duct structure 11 is divided by a vertical partition 21 into two passageways, one serving as an air inlet duct 22 and the other as an air exhaust duct 23 for the cabinet 10. These ducts communicate through openings 24, 25, and 30 in the back wall of the cabinet 10 with the interior thereof.

The passage traversed by the air which enters the room to be cooled, hereinafter referred to as the room, and the apparatus for filtering, circulating, and cooling this air will now be described. The cooled air issuing from the room cooler may be taken from the room, thereby providing for a recirculation of the room air, or may be taken from outside the room through the window inlet duct.

Two air inlets are, accordingly, provided for this air, one being an opening 26 located at the base of the rear wall of the cabinet 10 and the other being an opening 24 located a spaced distance above the opening 26 and communicating with the window inlet duct 22. A common closure slide 27 is provided for the two openings 24 and 26, which slide, in its upper position, covers the window duct opening 24 and uncovers the room air opening 26, and, in its lower position, covers the room air opening 26 and uncovers the window inlet duct opening 24. Intermediate positions of the closure slide 27 cover and uncover proportional areas of these openings 24 and 26 so that any mixture of room and outside air may be passed through the room cooler.

The plate type air filter 32 comprising spun glass or the like is placed diagonally across the filtering compartment 18, dividing this compartment into an unfiltered air chamber 33 and a filtered air chamber 34. The air filter 32 is removable for replacement. The upper portion of the filter compartment 18 above the air filter 32 is blocked off by a baffle 36 and is reserved for the electric control. A centrifugal fan 37 is located in the filtered air chamber 34 and communicates by means of a cloth duct 38 with the central rear portion of the cooling compartment 14. The fan 37 thus effects a circulation of air through either or both of the openings 24 and 26, through the unfiltered air chamber 33, through the air filter 32, through the filtered air chamber 34, through the fan 37 itself and through the cloth duct 38 into the air cooling compartment 14.

The cooling compartment 14 is divided by an evaporator or cooling unit 39 and baffles 41 into an air receiving chamber 42 and an air exhaust chamber 43. The evaporator 39 comprises a series of spaced parallel plates 44 through which a refrigerating tube 46 is passed back and forth. The air delivered by the blower to the air receiving chamber 42 passes between the parallel plates 44 of the evaporator 39, is cooled by the tube 46 and the plates 44, and passes to the air exhaust chamber 43. From this chamber 43, the cooled air issues through a grille 47 at the upper front edge of the cabinet 10 into the room.

The apparatus compartment 19 contains the necessary apparatus for supplying the evaporator 39 with liquid refrigerant and removing the vaporized refrigerant therefrom, which apparatus is well known in the art. It comprises a compressor 48, a motor 49 for driving the same, and a condenser 51 for cooling and liquefying the vaporous refrigerant withdrawn from the evaporator 39. The condenser 51, like the evaporator 39, comprises a series of spaced parallel plates 52 and a tube 53 into which the compressed refrigerant vapor is pumped by the compressor 48.

The compresor 48 and the motor 49 for driving the same are contained in a fluid-tight metal casing 54, which casing is housed partly in the upper portion of the apparatus compartment 19 and partly in the air inlet duct 22 of the removable duct structure 11. The condenser 51 is housed in the upper portion of the apparatus compartment 19 adjacent the motor-compressor unit 48, 49 and is secured to the horizontal wall 13. The condenser 51 is enclosed in a metal sheath 56 which communicates at the rear with the air outlet duct 23 of the window duct structure 11 through the opening 30 in the rear wall of the cabinet 10. A metal bedplate 58 is secured to the lower portion of the sheath 56 of the condenser 51 and to the central portion of the vertical wall 15 and supports the motor-compressor unit 48, 49 through springs 59 interposed between the unit 48, 49 and the bedplate 58.

Figure 1:
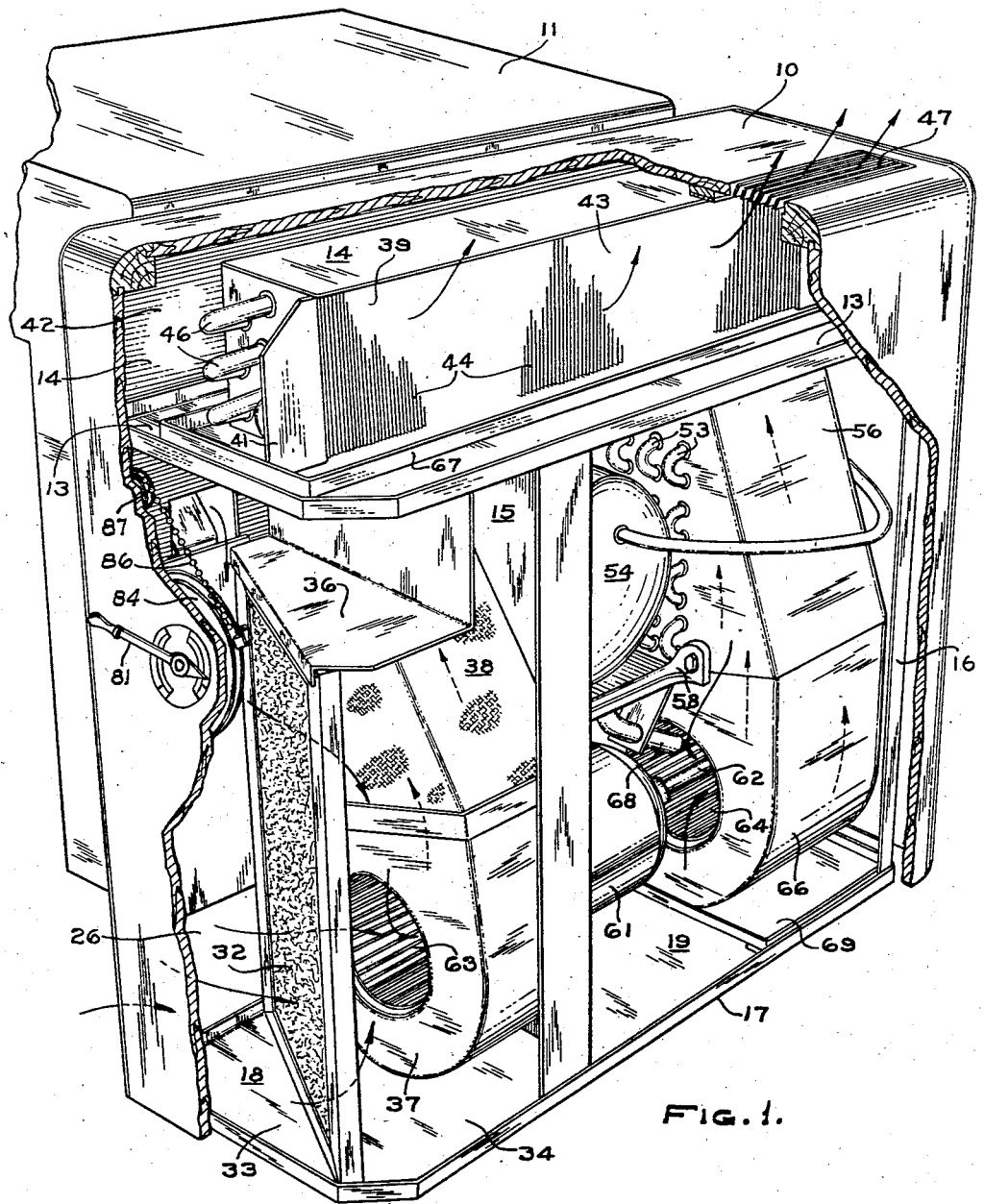
Fig. 1 is a view in perspective of a room cooler and the control of this invention as seen from the front, with parts of the cabinet broken away.
Figure 2:
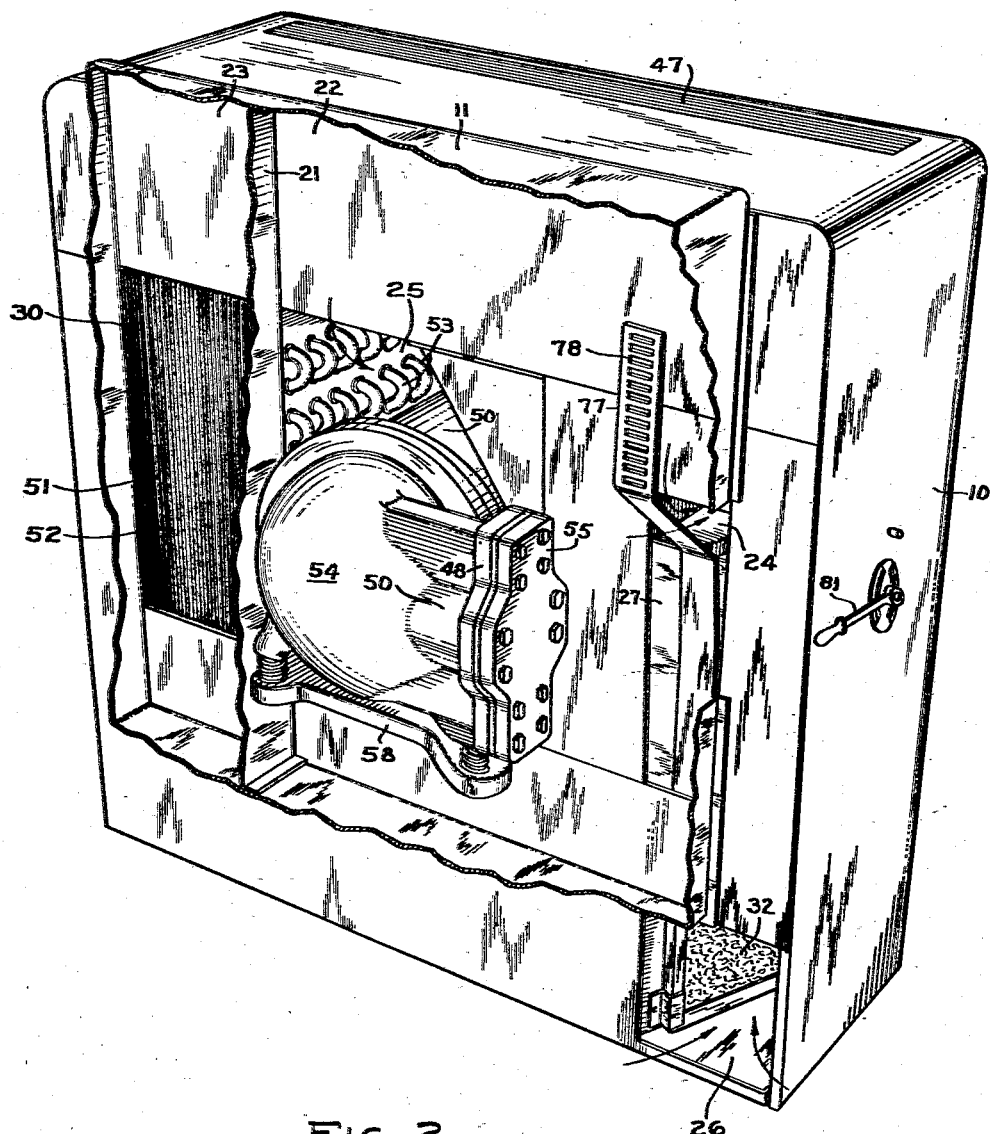
Fig. 2 is another view in perspective of the room cooler as seen from the rear, with parts of the window ducts broken away.

A motor 61 having an overhanging shaft 62 at both ends is secured in the lower portion of the apparatus compartment 19 substantially as shown in Fig. 1. One overhanging end of the shaft 62 projects through the vertical wall 15 into the filter compartment 18 and drives the rotor 63 of the centrifugal fan 37. The other end of the overhanging shaft 62 carries and drives a rotor 64 of a double inlet blower 66, which blower 66 communicates with the lower front portion of the condenser sheath 56. The rear of the cabinet is open adjacent the motor-compressor unit 48, 49 and communicates with the air inlet duct 22 of the window duct structure 11 so that an air passage is formed connecting the apparatus compartment 19 with the inlet duct 22. The apparatus compartment 19 also communicates with the double inlet blower 66 so that the blower 66 draws air through the air inlet duct 22 of the window duct structure 11 through the portion of the apparatus compartment 19 housing the motor compressor unit 48, 49 and the motor 61 and forces the air through the condenser sheath 56 between the condenser plates 52 and out through the air exhaust duct 23 of the window duct structure 11, thereby cooling the condenser 51 to liquefy the refrigerant vapors therein.

A portion of the moisture of the air passing through the evaporator 39 will condense thereon. This moisture drips into a pan 67 located below the evaporator 39 and drains through a hose 68 into the rotor 64 of the blower 66. The moisture is atomized by the rotor 64 of the blower 66 and a portion thereof vaporizes. Another portion is blown against the warm condenser 51 where it is evaporated. A further portion of the atomized water is thrown against the casing of the blower 66. This water will run down and collect in a water pan 69 at the base of the blower casing, entering the pan 69 through holes in the lower portion of the casing of the blower 66. When the level of the water in the pan 69 and in the blower casing rises to adjacent the outer circumference of the rotor 64, it is entrained in the blower air stream.

The apparatus of this invention is also adapted for a rapid discharge of the air of the room through the window-outlet duct 23. An opening 71 is provided for this purpose in the rear wall of the window-inlet duct 22. This opening 71 is normally closed by a flapper valve 72 pivoted to the inner wall of the duct immediately above the opening 71. The weight of the valve 72 ordinarily holds it in the closed position. A plate 73 is secured to the valve 72 and has a portion 74 extending sidewardly thereof. The sidewardly-extending portion 74 carries a finger 76 which extends substantially at right angles to the valve plate 72 and inwardly in the air duct 22 when the valve 72 is closed.

The closure slide 27 is provided with an operating element comprising a strip of metal 77 secured to the lower edge of the closure slide 27. The strip 77 lies adjacent the slide for about four-fifths of its length and is then bent rearwardly to project into the air inlet duct 22 through the opening 24 of the cabinet 10. The upper end of the strip 77 is bent upwardly and is provided with a series of horizontal slots 78 which are adapted to engage with the finger 76 on the flapper valve 72.

When the slide 27 is in an upper position, as indicated in Fig. 8, the rearwardly-bent portion of the strip 77 strikes the upper edge of the opening 24, and on further upward movement of the slide 27, is forced rearwardly so that one of the slots 78 in the upper end of the strip 77 engages the finger 76. A further upward movement of the slide 27 pushes the finger 76 upwardly to the position shown in Fig. 9 to open the flapper valve 72. When this valve 72 is in its uppermost position, as shown in Fig. 9, it obstructs the inlet duct 22 and permits air to be withdrawn from the room through the opening 71 by the blower 66 and forced over the condenser 51 and out through the outlet duct 23 of the window-connecting duct 11. The elevation of the window duct structure 11 relative to the cabinet 10 determines which of the horizontal slots 78 in the operating strip 77 engages the finger 76. Changes in the elevation of the window-connecting duct 11 can thus be made without affecting the actuation of the valve 72.

Control

The room cooler is fitted with a control which forms the subject-matter of this invention. This control comprises a single operating lever by means of which the room cooler can be turned on or off and by means of which the various valves in the room cooler are actuated to produce any of the following actions: an introduction of outside air to the room at the prevailing outside air temperature, introduction of cooled outside air to the room, a circulation of uncooled air in the room, a circulation of cooled air in the room, an introduction into the room of outside air intermixed with any desired degree of inside air which intermixture may be introduced either at its natural temperature or in a cooled condition, and a rapid exhaust of the room air through the window duct in order to rapidly clear out tobacco smoke or other vapors from the room. This exhaustion of the room air may be done either with or without cooling the air of the room.

In order to accomplish these results, an operating lever 81 is secured to the overhanging end of the shaft 82, which shaft is journaled in a bearing (not shown) in the wall of the cabinet 10 and a second bearing (not shown) in a switch box 83. A grooved operating pulley 84 and a contact finger 85 are fixedly secured to the shaft 82. An operating chain 86 is secured, at one of its ends, to the periphery of the operating pulley 84, passes over an idler pulley 87, and has its other end secured to a lug 88 which is attached to the closure slide 27 and extends sidewardly thereof.

When the operating lever 81 is in its lowermost position, the closure slide 27 drops to its lowest position and covers the opening 26 and uncovers the opening 24. This position is shown in Fig. 7. As the operating lever 81 is turned either to the right or left, the operating chain 86 will be wound on the operating pulley 84 and raise the closure slide 27 a distance proportional to the arc through which the operating lever 81 is turned.

The switch box 83 is supported by three brackets 89 adjacent the end of the shaft 82 and is provided with two contact segments 91 and 92. The segment 91 extends substantially around the shaft 82 and the segment 92 forms a semicircle adjacent one side thereof. The contact segments 91 and 92 lie in the plane of sweep of the contact finger 85 and are adapted to make contact therewith. The upper section of the switch box 83 is devoid of the contact segments and is the "off" position of the contact finger 85.

The wiring of the switch box 83 to the electrical apparatus of the room cooler is as follows: The contact finger 85 is connected by a lead 93 to the power line 94. Segment 91 is connected by a lead 95 to one terminal of the blower motor 61. The other terminal of the blower motor 61 connects through lead 96 with the power line 97. A further lead 98 connects lead 96 to one terminal of the compressor motor 49 and the other terminal of the compressor motor 49 connects through lead 99 with the contact segment 92.

Operation of control

It will be apparent from the above that, when the operating lever 81 is rotated through a slight arc in the clockwise direction with respect to the view shown in Figs. 7 to 11, inclusive, the contact finger 85 contacts both of the contact segments 91 and 92, so that power is supplied to both the blower motor 61 and the compressor motor 49. This slight rotation of the operating handle leaves the closure slide 27 substantially unaffected, so that the rotor 63 draws air through the window duct and passes it through the filter 32, through the cooling unit 39, and out through the grill 47. Since the compressor motor 49 is in operation, the air will be cooled as it passes through the cooling unit 39. The room cooler, when operating in this manner, is the least effective insofar as cooling the room air is concerned because the air being circulated through the cooling unit is at the prevailing high outside temperature when it enters the cooling unit. This position, however, introduces a maximum of fresh air into the room.

As the rotation of the operating lever 81 is continued in the clockwise direction, the closure slide 27 is gradually elevated to partially obstruct the outside air opening 24 and to partially open the room air opening 26. In this position of the lever 81, a mixture of outside and room air is admitted to the room, the proportioning of the mixture depending upon how for the lever 81 is rotated in the clockwise direction. When the lever 81 is rotated to the position shown in Fig. 8, the room air opening 26 is fully opened and the outside air opening 24 is fully closed so that only a recirculation and cooling of the room air results. This mode of operation of the room cooler is most effective for cooling the air in the room because the relatively cool air of the room is continually recirculated through the cooling unit 39 and cooled to a still lower degree.

Still further rotation of the operating lever 81 results in the gradual opening of the flapper valve 72 which valve admits room air through the opening 71 and, in its more elevated position, obstructs the inflow of outside air to the condenser. The rotation of the operating lever 81, as just described, thus provides that a variable amount of room air is exhausted by the condenser blower 64 to the outside air, the actual amount depending on the position to which the lever 81 is moved. When the room air is exhausted in this manner it is desirable that a window or door at the far side of the room be opened to admit fresh air to replace the air being exhausted.

Substantially the same series of actions of the room cooler can be achieved without cooling the air of the room. To effect this, the operating lever 81 is moved from the "off" position in the counterclockwise direction. Rotation in this direction brings the contact lever 85 in contact with only the segment 91 and, therefore, energizes only the air circulating motor 61. The valves 27 and 72 will be actuated in the same manner as before described and the same results achieved with the exception that the air circulated through the cooling unit is not cooled. Fig. 9 shows the operating lever 81 in the air exhaust and non-cooling position.

It will be apparent from the above that this invention provides a unitary control for air conditioning apparatus by means of which the air conditioning apparatus may be turned on or off and by means of which the various operating valves of the apparatus may be actuated conjointly to provide the various air conditioning effects desired. It will also be apparent that this regulating device is especially suited for a unitary room cooler.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In an air conditioning system for a chamber, the combination of a cooling unit, means for circulating air from within said chamber and from without said chamber in varying proportions over the cooling unit to cool said air and discharge the cooled air into said chamber, a movable control for said air-circulating means, said control being adapted when in one position to render said air-circulating means inactive and when in a plurality of other positions to render said air-circulating means active, the control in each of said plurality of other positions effecting a different proportioning of said cooled air from the proportioning effected by the remainder of said other positions.

2. In an air conditioning system for a chamber, the combination of a cooling unit, means for activating said cooling unit by decreasing its temperature, means for circulating air from within said chamber and from without said chamber in varying proportions over the cooling unit to cool said air and discharge the cooled air into said chamber, a movable control for said air-circulating means, said control being adapted when in one position to render said air-circulating means and said activating means inactive and when in a plurality of other positions for rendering said air-circulating means and said activating means active, each of said plurality of other positions effecting a different proportioning of said cooled air from the proportioning effected by the remainder of said other positions.

3. In an air conditioning system for a chamber, the combination of a condenser, an evaporator, means for pumping vaporized refrigerant from the evaporator to the condenser, means for circulating air from within the chamber and from without the chamber in any desired proportion over the evaporator and discharging said air into said chamber, means for circulating air from without the chamber and from within the chamber in any desired proportion over the condenser and discharging the air without said chamber, and a movable control for both of said means, said control being adapted when in one position to render both of said means inactive and when in a plurality of other positions to render both of said means active, a portion of said plurality of other positions each effecting a different proportioning of the air circulating over the evaporator from the proportioning effected by the remainder of said portion of other positions and a second portion of said plurality of positions each effecting a different proportioning of the air circulated over the condenser from the proportioning effected by the remainder of said second portion of positions.

4. In an air conditioning system for a chamber, the combination of a condenser, an evaporator, means for pumping vaporized refrigerant from the evaporator to the condenser, means for conveying air from the chamber over the evaporator and discharging said air into the chamber, a control for said last-mentioned means, a means for conveying air from without the chamber over the evaporator and discharging said air into the chamber, a control for said last-mentioned means, a means for conveying air from said chamber over said condenser and discharging said air without said chamber, a control for said last-mentioned means and a master control comprising at least one movable element connected with said three controls to adjust the same in a predetermined manner.

5. In an air conditioning system for a chamber, the combination of an evaporator, a condenser, a compressor, a motor for driving the compressor, a switch for controlling said motor, means for conveying cooling air from without said chamber over the evaporator and discharging said air within said chamber, a control for said means, a means for circulating cooling air from within said chamber over the condenser and discharging said air without said chamber, a control for said last-mentioned means, a master control adapted for movement from a fixed point, said master control being so connected with said switch that the switch is opened when the master control is moved to said fixed point and closed when the master control is moved away from said fixed point, said master control being also connected to the controls of both of said means to adjust said controls on further movement of said master control after said switch is closed, said master control being adapted to adjust the first-mentioned control to vary the flow of and to provide minimum flow of air from without said chamber over the evaporator while maintaining the second-mentioned control positioned for minimum flow of air from within said chamber over the condenser.

6. In an air conditioning system for a chamber, the combination of a cooling unit, means for circulating air from within said chamber and from without said chamber in varying proportions over the cooling unit to cool said air and discharge the cooled air into said chamber, a movable control for said air circulating means, said control being adapted when in one position to render said air circulating means inactive, upon movement in one direction from said one position to a second position to render said air circulating means active and to effect a predetermined proportioning of air from within said chamber and air from without said chamber, and upon progressive movement in the same direction from said second position to effect progressive change in the proportioning of said air from within said chamber and said air from without said chamber while maintaining the air circulating means active.

7. In an air conditioning system for a chamber, the combination of a condenser, an evaporator, means for pumping refrigerant from the evaporator to the condenser, means for circulating air from within the chamber and from without the chamber in varying proportions over the evaporator to cool the air and discharging the air into the chamber, means for circulating air from without the chamber and from within the chamber in varying proportions over the condenser and discharging the air without the chamber, and a movable control for both of said means, said control being adapted, when in one position, to render both of said means inactive, upon movement in one direction to a second position to render both of said means active, upon progressive movement in the same direction from said second position to progressively vary said proportioning of the air circulated over the evaporator and thereafter upon still further progressive movement in the same direction to progressively vary said proportioning of the air circulated over the condenser.

8. In an air conditioning system for a chamber, the combination of a cooling unit, means for circulating air from within said chamber and from without said chamber over the cooling unit to cool said air and discharging the cooled air into said chamber, means for varying the proportions of air from within and from without said chamber, a rotatable control element for actuating said proportion-varying means, a member connected between the rotatable element and said proportion-varying means in such manner that the member is moved in one direction by rotary movement of said control element in either direction from a predetermined position and is moved in the opposite direction upon rotary movement of the control element toward said predetermined position, and a controlling device for rendering said cooling unit inactive when said control element is in said predetermined position or is moved therefrom in one direction and for rendering the cooling unit active when the control element is moved from said predetermined position in the opposite direction, whereby on turning said rotatable control, varying proportions of air from within and from without said chamber are passed over the cooling unit either with or without cooling of the air.

9. In an air conditioning system for a chamber, the combination of a cooling unit, means for activating said cooling unit by decreasing its temperature, means for circulating air from within said chamber and from without said chamber in varying proportions over the cooling unit to cool said air and discharge the cooled air into said chamber, a pulley, a flexible tension member secured at one end to the periphery of said pulley and adapted to be wound thereon when the pulley is rotated on its axis in either direction from a predetermined position, said tension member being connected to said air-circulating means to vary the proportion of air taken from within said chamber and from without said chamber when the pulley is rotated in either direction from said predetermined position, and a controlling device associated with said pulley to render said means for activating said cooling unit and said air-circulating means inactive when the pulley is at said predetermined position and to render said pumping means inactive and said air-circulating means active when the pulley is rotated in one direction from said predetermined position and to render said activating means and said air-circulating means active when said pulley is rotated from said predetermined position in the direction opposite from said last-mentioned direction.

10. In an air conditioning system for a chamber, the combination of a condenser, an evaporator, means for pumping vaporized refrigerant from the evaporator to the condenser, means for circulating air from within the chamber and from without the chamber in any desired proportion over the evaporator and discharging said air into said chamber, means for circulating air from without the chamber and from within the chamber in any desired proportion over the condenser and discharging the air without said chamber, a pulley, a flexible tension member secured at one end to the periphery of said pulley and adapted to be wound thereon when the pulley is rotated on its axis in either direction from a predetermined position, said tension member being connected to said means for circulating air over the evaporator and over the condenser to vary the proportion of air taken from within and from without said chamber when the pulley is rotated in either direction from said predetermined position, and a controlling device associated with said pulley to render said pumping means and both of said air-circulating means inactive when the pulley is at said predetermined position and to render said air-circulating means active when the pulley is moved to a plurality of positions in either direction from said predetermined position and to render said pumping means active when the pulley is moved in one direction from said predetermined position and inactive when said pulley is moved in the opposite direction from said predetermined position.

11. In an air conditioning system for a chamber, the combination of a condenser, an evaporator, means for pumping vaporized refrigerant from the evaporator to the condenser, means for circulating air over the evaporator and discharging said air into the chamber, said circulating means having an entrance communicating with said chamber and a second entrance communicating with the atmosphere exterior of said chamber, a valve controlling each of said entrances, a switch for controlling said pumping means, and a master control comprising a single element adapted for manual operation to regulate each of said valves and actuate said switch.

12. In an air conditioning system for a chamber, the combination of a condenser, an evaporator, means for pumping vaporized refrigerant from the evaporator to the condenser, means for circulating air over the evaporator and discharging said air into the chamber, said circulating means having an entrance communicating with said chamber and a second entrance communicating with the atmosphere exterior of said chamber, a valve controlling each of said entrances, a switch for controlling said pumping means, a second switch for controlling said circulating means, and a master control comprising a single element adapted for manual operation to regulate each of said valves and actuate each of said switches.

13. In an air conditioning system for a chamber, the combination of a condenser, an evaporator, and means for pumping vaporized refrigerant from the evaporator to the condenser, means for circulating air over the evaporator and discharging said air into the chamber, said circulating means having an entrance communicating with said chamber and a second entrance communicating with the atmosphere exterior of said chamber, a valve controlling each of said entrances, a device for circulating air over said condenser, said device having an entrance communicating with said chamber and a second entrance communicating with the atmosphere exterior of said chamber, a valve controlling one of said entrances of said air circulating device, and a master control comprising a single element adapted for manual operation to regulate each of said three valves.

14. In an air conditioning system for a chamber, the combination of a condenser, an evaporator, and means for pumping vaporized refrigerant from the evaporator to the condenser, means for circulating air over the evaporator and discharging said air into the chamber, said circulating means having an entrance communicating with said chamber and a second entrance communicating with the atmosphere exterior of said chamber, valve means controlling each of said entrances, a device for circulating air over said condenser, said device having an entrance communicating with said chamber and a second entrance communicating with the atmosphere exterior of said chamber, valve means controlling each of said entrances of said air circulating device, and a master control comprising a single element adapted for manual operation to regulate each of said valve means.

15. In an air conditioning system for a chamber, the combination of a condenser, an evaporator, and means for pumping vaporized refrigerant from the evaporator to the condenser, means for circulating air over the evaporator and discharging said air into the chamber, said circulating means having an entrance communicating with said chamber and a second entrance communicating with the atmosphere exterior of said chamber, valve means controlling each of said entrances, a device for circulating air over the condenser and discharging said air exterior of said chamber, said air-circulating device having an entrance communicating with said chamber and a second entrance communicating with the atmosphere exterior of said chamber, valve means controlling each of said entrances of the circulating device, a switch for controlling said pumping means, and a master control comprising a single element adapted for manual operation to regulate each of said valve means and actuate said switch.

16. In an air conditioning system for a chamber, the combination of a condenser, an evaporator, and means for pumping vaporized refrigerant from the evaporator to the condenser, means for circulating air over the evaporator and discharging said air into the chamber, said circulating means having an entrance communicating with said chamber and a second entrance communicating with the atmosphere exterior of said chamber, valve means controlling each of said entrances, a device for circulating air over the condenser and discharging said air exterior of said chamber, said air-circulating device having an entrance communicating with said chamber and a second entrance communicating with the atmosphere exterior of said chamber, valve means controlling each of said entrances of the circulating device, a switch for controlling said air-circulating means and air-circulating device, and a master control comprising a single element adapted for manual operation to regulate each of said valve means and actuate said switch.

17. In an air conditioning system for a chamber, the combination of a condenser, an evaporator, and means for pumping vaporized refrigerant from the evaporator to the condenser, means for circulating air over the evaporator and discharging said air into the chamber, said means having an entrance communicating with said chamber and a second entrance communicating with the atmosphere exterior of said chamber, valve means controlling each of said entrances, a device for circulating air over the condenser and discharging said air into the atmosphere exterior of said chamber, said circulating device having an entrance communicating with said chamber and a second entrance communicating with the atmosphere exterior of said chamber, valve means controlling each of the entrances of said circulating device, a switch for controlling said pumping means, a second switch for controlling said air-circulating means and air-circulating device, and a master control comprising a single element adapted for manual operation to regulate each of said valve means and actuate both of said switches.

18. In an air conditioning system for a chamber, the combination of an evaporator, a condenser, a compressor, means for driving the compressor, means for conveying air from within said chamber and from without said chamber over the evaporator to cool said air and discharging the cooled air into said chamber, a movable control for varying the proportions of air from within said chamber and from without said chamber, said control being adapted when in one position to render said compressor driving means inactive and when in a plurality of other positions to render said compressor driving means active, the control in each of said plurality of other positions effecting a different proportioning of air from the proportioning effected by the remainder of said other positions.

19. In an air conditioning system for a chamber, the combination of an evaporator, a condenser, a compressor, a motor for driving the compressor, a switch for controlling said motor, means for circulating air over the evaporator and discharging said air within said chamber, means for circulating air over the condenser and discharging said air without said chamber, means for supplying a mixture of air from within said chamber and from without said chamber to one of said circulating means and including means for varying the proportions thereof, and a control adapted for movement from a fixed point, said control being so connected with said switch that the switch is opened when the control is moved to said fixed point and closed when the control is moved away from said fixed point, said control being also connected to said proportioning means to vary the proportion of air from within the chamber and from without the chamber on further movement of said control after said switch is closed.

20. The combination set forth in claim 18 wherein said control renders said air-conveying means effective in said plurality of other positions.

21. The combination set forth in claim 19 wherein said control renders both of said air-circulating means effective when the control is moved away from said fixed point.

ARTHUR H. EBERHART.